United States Patent [19]

Robertson

[11] 4,380,995

[45] Apr. 26, 1983

[54] SOLAR ENERGY CONVERTERS AND ABSORBERS THEREFOR

[76] Inventor: Alastair Robertson, Glentramman Manor House, Lezayre, nr. Ramsey, Isle of Man, England

[21] Appl. No.: 36,765

[22] Filed: May 7, 1979

[51] Int. Cl.³ ............................................. F24J 3/02
[52] U.S. Cl. .................................. 126/438; 126/425; 126/442
[58] Field of Search ............... 126/438, 439, 440, 444, 126/442, 446, 450, 425, 448

[56] References Cited

U.S. PATENT DOCUMENTS

| | | | |
|---|---|---|---|
| 1,345,758 | 7/1920 | Folsom | 126/438 |
| 1,661,473 | 3/1928 | Goddard et al. | 126/438 |
| 1,837,449 | 12/1931 | Kunz | 126/448 |
| 3,200,820 | 8/1965 | Garrett | 126/438 |
| 3,951,128 | 4/1976 | Schoenfelder | 126/438 |
| 3,998,206 | 12/1976 | Jahn | 126/438 |
| 4,033,324 | 7/1977 | Eckels | 126/440 |
| 4,086,911 | 5/1978 | Futch | 126/443 |
| 4,107,521 | 8/1978 | Winders | 250/203 R |
| 4,132,222 | 1/1979 | Roark | 126/444 |
| 4,134,391 | 1/1979 | Mahdjuri et al. | 126/438 |
| 4,136,673 | 1/1979 | Escher | 126/443 |
| 4,147,154 | 4/1979 | Lewandowski | 126/425 |
| 4,150,663 | 4/1979 | Sisson | 126/438 |
| 4,161,942 | 7/1979 | Monk | 126/438 |
| 4,210,463 | 7/1980 | Escher | 126/438 |

FOREIGN PATENT DOCUMENTS

| | | | |
|---|---|---|---|
| 394232 | 4/1924 | Fed. Rep. of Germany | 126/439 |
| 1243221 | 4/1960 | France | 126/438 |
| 2127673 | 9/1972 | France | 126/451 |
| 2300913 | 2/1975 | France | 126/438 |
| 2326668 | 10/1975 | France | 126/444 |

OTHER PUBLICATIONS

Solar Energy, vol. 19, No. 6, Caveller and Foligno, Pergamon Press, 1977, pp. 677-683.

Primary Examiner—James C. Yeung
Attorney, Agent, or Firm—Alexis Barron

[57] ABSTRACT

Solar energy converters convert solar radiation into usable heat energy by means of a reflector which collects and focuses the solar radiation onto an absorber provided with an internal chamber through which a heat exchange fluid may be passed. As the absorber is heated by radiation focussed thereon the heat may be extracted into the fluid. To minimize the volume of the internal chamber and thus increase the efficiency and sensitivity of the heat transfer, the absorber is formed with curved walls to define an internal chamber having a crescent-shaped cross-section.

12 Claims, 9 Drawing Figures

SOLAR ENERGY CONVERTERS AND ABSORBERS THEREFOR

BACKGROUND OF THE INVENTION

1. Field of the Invention

This invention relates to improvements in or relating to solar energy converters, and in particular concerns an absorber for solar energy converters having an internal chamber through which a heat exchange fluid may be passed.

It has been known for many years that the sun provides an enormous amount of energy in the form of visible and invisible radiation to the earth's surface, and that this energy may be converted into other forms of energy such as heat and electricity. In recent years the increased cost of conventional fuels has resulted in great interest in the utilization of the sun's energy for commercial and domestic purposes.

2. Description of the Prior Art

Photoelectric devices are well known for use in converting light energy directly into electrical energy, but such devices are expensive. Moreover, for many applications it is more convenient to convert the sun's energy into heat energy.

A simple known form of apparatus for effecting the conversion to heat energy comprises a flat plate arranged to absorb solar radiation so that the plate is heated. By contacting the plate with a heat exchanger this heat may be put to use. However, this type of arrangement is highly inefficient in transferring energy to the heat exchanger as the plate also tends to re-radiate energy as its temperature rises.

A more sophisticated device for utilizing the sun's energy comprises a reflector which collects and focuses solar radiation onto an element which absorbs the radiation and is thus heated. By contacting the heated element directly or indirectly with a heat exchange fluid the heat may be extracted and then utilized in a variety of ways. Devices of this type are known as "solar energy converters" and the element which absorbs the focussed radiation is referred to herein as the "absorber".

The reflector of a solar energy converter is usually a concave mirror with either a circular or parabolic curvature, and the absorber is arranged at the focus of the mirror. A conventional arrangement employs a mirror concavely curved in one direction only, and thus generally part-cylindrical in shape, which focuses the sun's rays to a focal line parallel to the mirror surface. The absorber is then located along this focal line. Typically the absorbers are in the form of tubes through which a heat transfer fluid is passed.

Various forms of tubular absorbers are known. The simplest known form comprises a cylindrical tube through which the heat exchange fluid may be passed. However, although such a cylindrical tube presents a convex surface to the mirror which is effective at absorbing radiation, it also has a convex surface directed away from the mirror and this acts as a radiator giving rise to considerable heat losses from the absorber. More complex tubular members having star-shaped cross-sections have also been employed with a view to increasing the radiation-receiving surface, but such arrangements merely compound the shortcomings of the cylindrical absorber by increasing the radiating surface of the absorber.

Thus, known forms of solar energy converter tend to be inefficient, extracting only a small proportion of the available energy from the sun's radiation, principally because of the inefficiency of the absorbers used and at least in part this results from radiated heat loss from the absorber.

BRIEF SUMMARY OF THE INVENTION

The object of this invention is to provide solar energy converters which overcome disadvantages of known converters.

It is an object of the invention to provide a new form of absorber which is more efficient in absorbing solar energy and transferring this, in the form of heat, to a heat exchange fluid.

It is also an object of the invention to provide a solar energy converter employing more efficient forms of reflector and for a control system for enabling the reflector to be oriented to receive maximum solar radiation.

In one aspect the invention provides an absorber for solar energy converters having an internal chamber through which a heat exchange fluid may be passed, in which the volume of the chamber is minimised by forming the absorber with a convexly-curved wall and a concavely-curved wall so that the internal chamber they define has a generally crescent-shaped cross-section.

DETAILED DESCRIPTION

The convex outer surface of the convexly-curved wall is intended to receive solar radiation focussed on to it by the reflector, and the absorber should therefore be mounted within the solar energy converter so that this surface is directed towards the reflector. A convexly-curved receiving surface means that the amount of energy absorbed can be maximised. By forming the internal chamber as a crescent-shaped envelope the volume of heat transfer fluid within the absorber is decreased, which results in greater efficiency and sensitivity.

The shape of the absorber is to a certain extent dictated by the reflector system employed in the solar energy converter. When a reflector curved in one direction is employed, as indicated above, the absorber is conveniently a tube. According to the invention in such application the absorber preferably comprises an elongate tubular member having a generally crescent-shaped cross-section.

The tubular member thus comprises a transversely convexly-curved outer wall and a transversely concavely-curved inner wall, with the two walls being joined along their elongate edges to form a continuous tube. It has been established that for the absorber to absorb the maximum amount of heat from the radiation focussed by the reflector, the focussed rays should strike the absorber substantially perpendicularly to its surface, and thus the optimum shape for the convex face of the absorber is determined by the shape of mirror used. When a parabolically-curved mirror is employed, the convex curvature of the outer wall of the tubular member is very preferably also parabolically-curved to a shape geometrically similar to that of the mirror. However, for ease of manufacture the curvature of the outer wall may be made part-circular without undue loss of efficiency even with a parabolic mirror.

When the reflector is curved in more than one direction other overall shapes of absorber are preferably employed. Thus, when the reflector has a double curvature, and is a spherically- or parabolically-curved "dish", the absorber is conveniently also formed in the shape of a corresponding "dish". A dished absorber may be formed from one or more elongate tubes—for example, by forming one such tube into a helix so that the helically-coiled outer wall presents a generally convexly-dished face to the reflector. Alternatively the absorber may comprise a generally circular, convexly-dished outer wall and a generally circular, concavely-dished inner wall joined at their edges to define a circular chamber having crescent-shaped cross-sections through its axis, there being means of passing heat exchange fluid into and out of the chamber, and preferably ducting within the chamber to ensure that the heat exchange fluid circulates throughout the chamber.

The convexly-curved wall of the absorber is preferably adapted to absorb radiation and most preferably this wall is provided with a layer or coating to improve its absorptive properties. However, any such coating should not be so thick as to interfere with the transmission of heat to the fluid within the absorber. Suitable absorptive coatings are known in the art and it is believed to be within the competence of one skilled in the art to select an appropriate coating for the outer wall. By way of example only it is pointed out that the outer wall of the tubular member may be painted with matt black paint.

The concavely-curved wall of the absorber is not intended to receive radiation being directed away from the reflector and although the concave shape of this wall markedly reduces the amount of radiation, for the most efficient working of a solar energy converter it has been found that it is important to reduce, and if possible eliminate, any tendency of the absorber to radiate heat from its side remote from the reflector. Accordingly, it is a highly preferred feature of this invention that all but the radiation-receiving surface of the absorber is provided with thermal insulation. Thus, the concavely-curved wall and any portion of the absorber not facing the reflector are preferably thermally insulated. Thermal insulators in themselves are well known, but heretofore the problem of radiation from the absorber in solar energy converters has not been appreciated or has not been effectively prevented. Any good thermal insulator may be used on the absorber, but we have found asbestos or a similar fibrous insulating material (such as those containing alumina) to be a particularly effective insulating material for this purpose. In an especially preferred embodiment the insulating material is used in the form of one or more strands of rope, but other preformed shapes would be suitable. On large scale absorbers, it may be more convenient to apply a non-fibrous insulating material.

The thickness of the thermal insulation needed depends on the temperature of the absorber when in operation, the size of the absorber and the nature of the insulation used. However, by way of illustration, when using asbestos rope in a small installation with an absorber in the form of an elongate tube and attaining temperatures of from 100° to 200° C. (212° to 392° F.) it has been found desirable to employ an asbestos rope of circular cross-section sufficiently large to fill the channel defined by the concavely-curved inner wall supplemented by two further strands of smaller section asbestos rope to insulate the tubular member along the edges defined by the extremities of the crescent-shaped cross-section. On larger installations it may not be necessary completely to fill this channel on a tubular absorber to achieve adequate insulation, provided that an adequate layer of thermal insulation is applied to surface of the tubular member directed away from the reflector.

The concave curvature of the inner wall of the absorber reduces the cross-sectional area of the tubular member. This effect is most important since a reduced cross-section means that a smaller volume of heat transfer fluid is needed to fill the tube. A small volume of fluid has a correspondingly smaller heat capacity so that the fluid will be more rapidly heated by radiation falling on the absorber, and at the same time the temperature of the fluid will vary more rapidly with changes in the amount of radiation hitting the absorber so making the converter as a whole more sensitive. This sensitivity enables the converter incorporating the absorber of the invention to employ sophisticated control systems as defined hereinafter. Furthermore, the relatively rapid transit of a small volume of heat transfer fluid along the tubular member discourages laminar flow and the fluid more rapidly reduces the surface temperature of the absorber; this in turn reduces the tendency of the absorber to act as a radiator.

It is therefore a feature of the absorber of the invention that the internal chamber is a narrow conduit defined between the outer and inner walls through which heat transfer fluid is passed. To reduce the volume of the internal chamber as much as possible, it is desirable for the curvature of two walls to be geometrically similar, so that the conduit defined by these surfaces is of substantially constant thickness.

When the absorber is in the form of a tubular member this may be formed by simple extrusion techniques, or alternatively it may be formed by pressing an appropriately dimensioned cylindrical tube to form the member with a generally crescent-shaped cross-section. As explained above, a dished absorber may be formed from elongate tubes or fabricated from two dished walls.

The absorber must be of sufficient strength so that it can be readily supported within the solar energy converter even when it contains heat transfer fluid at elevated temperatures. The material of which the tubular member is made should also allow heat to pass from its outer surface to the heat transfer fluid, and thus must be a good conductor of heat. The transfer is also enhanced by making the wall thickness of the tubular member as low as possible while preserving the necessary strength. The tubular member must also be resistant to corrosion by the heat transfer fluid at the elevated temperatures to which it is subjected. In general, the tubular member is formed of a metal, and copper, steel and aluminium are particularly suitable for most applications. In high temperature applications, or where the heat transfer fluid is particularly corrosive, titanium, graphite or other substantially inert materials may be used.

As described hereinbefore a heat transfer fluid is passed through the absorber, and thus the tubular member is adapted to be sealingly connected to a heat transfer fluid input pipe and to a heat transfer fluid output pipe. The output pipe and input pipe may then be connected to a heat transfer fluid reservoir or to a heat exchanger, so that the heat content of the fluid may be put to use in conventional manner.

The heat transfer fluid used in the absorber is chosen having regard to the function of the solar energy converter and the temperatures to which it is subjected. It may be a gas such as steam or water vapour. In most installations, however, the fluid will be a liquid and it may simply be water, although this may contain corrosion inhibitors if necessary. Such inhibitors are well known to those skilled in the art.

Other heat exchange fluids such as fluoro-substituted hydrocarbons may be used. When high temperatures are likely to be encountered a higher boiling point liquid such as polyglycol may be employed.

In use the absorber is mounted to lie at the focus of the reflector of a solar energy converter. Thus, when the reflector is parabolically-curved in one direction the absorber is mounted to lie along the focal line with the convexly-curved outer wall directed towards the reflector so that the radiation focussed by the reflector falls substantially perpendicularly onto the outer wall of the absorber. When a dished reflector is employed the absorber is mounted at the focus point.

This invention extends to solar energy convertors incorporating one or more absorbers of the invention.

The reflector may be any appropriately shaped surface capable of reflecting solar radiation and particularly the infra-red portion of this radiation. Obviously the more efficient the reflector the more efficient is the solar energy converter as a whole. Plate glass reflectors may be used, but they are very expensive to manufacture, and polished metal reflectors provide a more economical alternative amongst conventional reflecting surfaces.

We have discovered an extremely effective reflecting surface that gives excellent results when employed in solar energy converters is formed by applying a thin layer of aluminium to a supporting sheet. This has the advantages that it is a very effective reflector, is easy and convenient to handle, and is cheap to produce. The supporting sheet is preferably flexible to enable a variety of mirror configurations to be formed, and is most conveniently a sheet of plastics material such as PVC or a melamine-formaldehyde resin.

The aluminium may be applied to the supporting sheet by sputtering since no substantial thickness is required provided the reflecting surface is completely and substantially evenly coated with aluminium. Layers of aluminium only 100 Å thick may give satisfactory results although to be more robust it may be desirable to make the aluminium layer up to 20μ thick. A thickness of from 100 Å to 500 Å, and particularly a thickness of 300 Å, is preferred.

The thickness of the backing layer is not critical being dependent on the scale of the apparatus but for ease of handling a thickness of from 0.005 to 0.03 inches, and especially 0.01 to 0.02 inches has been found convenient.

The thin layer of aluminium may easily be damaged by scratching or oxidation and preferably it is protected with a covering layer. This layer is preferably a thin coating of a plastics material such as a polyester material. Advantageously, the layer is from 0.0001 to 0.005 inches thick and most preferably from 0.0001 to 0.001 inches thick. A preferred embodiment uses a covering layer 0.0005 inches thick.

The preferred reflecting material may be formed into any shape desired for a solar energy converter and generally is used to form a mirror having the reflecting surface concavely-curved in one direction. However, dished reflectors may also be formed—for example, by vacuum-forming. The mirror may be of circular curvature but is preferably parabolically-curved.

It is often advantageous that a reflector curved in one direction is elongate with the concave curvature transverse to the major axis. A mirror of this configuration may be obtained by mounting an appropriately proportioned rectangle of the composite sheet defined hereinbefore upon a concavely-curved face of a rigid shell adapted to hold the composite sheet in the desired configuration. The shell may be formed from glass reinforced plastics material or any similar material of appropriate strength. In a preferred embodiment one or more reflectors of the invention are mounted within reflector shells attached to a suitable frame.

The invention extends to a solar energy converter incorporating one or more reflectors as defined hereinbefore as well as to such converters which further incorporate one or more absorbers of the invention.

To realise the full advantages of the reflector and absorber of the invention, it is desirable that a solar energy converter incorporating these components be adapted to track the sun and be provided with a control system to effect this tracking.

A preferred control system for a solar energy converter follows the path of the sun and is provided with driving means to orient the solar energy converter, the control system comprising a unidirectional photoelectric cell mounted on the solar energy converter and arranged with a masking member positioned in front of the light-sensitive portion of the cell so that a light source casts a shadow on the cell only when the solar energy converter is oriented so that the or each reflector thereof receives solar radiation, the cell being electrically connectable to the driving means so that when a shadow is cast on the light-sensitive portion of the cell the driving means is immobilized but when no shadow is cast thereon the driving means is actuated to move the solar energy converter until it reaches an orientation when the driving means is immobilized.

The solar energy converter may be provided with driving means both to traverse the reflectors and to change their elevation so that they may always be arranged in the optimum position—that is, pointed directly at the sun so that the maximum amount of energy is concentrated at their foci. These driving means may be controlled by one or more control systems as described above.

However, it is possible for the elevation of the reflectors to be separately adjustable.

In a preferred embodiment the reflectors of the solar energy converter are mounted on a frame rotatable about a vertical axis by driving means actuable by the control system of the invention. The driving means conveniently comprises an electric motor arranged to traverse the reflectors by rotating the frame. A separate driving means may be provided, controlled by a separate control system, to adjust the elevation of the reflectors.

The sensitivity of the control system is determined by the size and position of the masking member. The smaller the masking member relative to the light-sensitive portion of the cell, the more sensitive the control system, provided always that the masking member is sufficiently large to cast a shadow that will immobilize the driving means when the cell, the masking member and the sun are aligned. Equally, the further the masking member from the light-sensitive portion of the cell the more sensitive the control system.

Since the sun moves across the sky always in the same direction, the driving means may be arranged to track the sun always in that same direction. However, the control system then is preferably provided with means to return the refelctors to the "dawn" position at the end of each day. To do this the control system preferably further comprises a second photoelectric cell arranged to detect ambient light conditions, and adapted to return the reflectors to the dawn position when darkness falls. To conserve elctricity the control system is preferably arranged to become de-activated until such time as ambient light condition, as detected by the second photo-electric cell indicate that the sun is again rising at dawn on the following day.

The elevation of the reflectors needs adjustment during the year to maintain the optimum elevation and preferably this adjustment is also effected using a control system as described hereinbefore.

The control system may also monitor the temperature of the heat transfer fluid so that if it gets too hot the driving means is actuated to move the reflectors out of the radiation-receiving position and traverse them forward to await the sun, and thus give a period for the fluid to cool before the radiation is again focussed onto the absorbers.

To prevent energy wastage, the control system also preferably monitors and compares the temperature of the heat transfer fluid entering and leaving the absorbers, and is arranged to switch off the pump circulating the fluid when the outlet temperature falls towards the inlet temperature. With this arrangement if the sun is obscured, for example by cloud, the fluid circulation will cease, and no energy will be wasted in pumping unheated fluid through the absorbers.

This invention will now be described, though only by way of illustration, with reference to the accompanying drawings in which.

Figure 1:
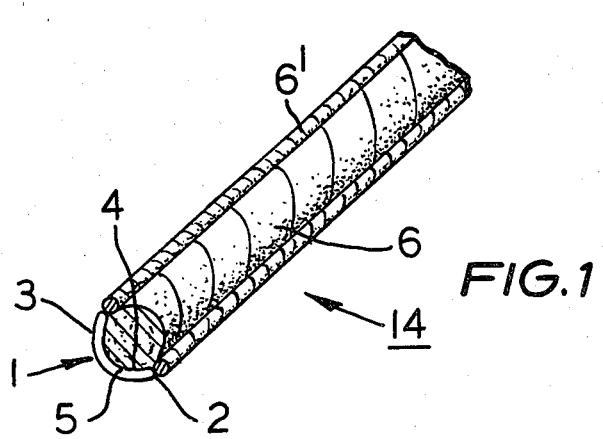
FIG. 1 shows a general perspective view of a portion of the tubular member of an absorber of the invention.
Figure 2:
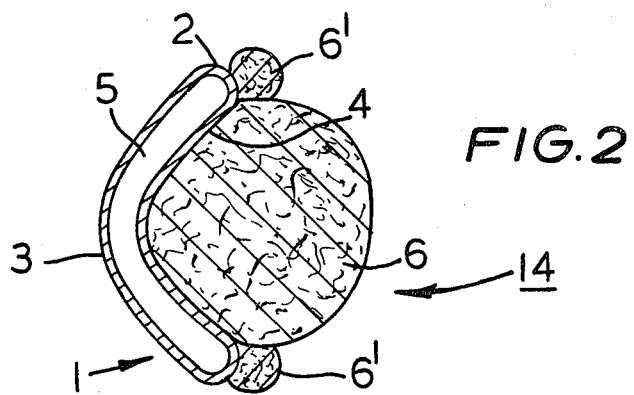
FIG. 2 shows a cross-section of the tubular member of FIG. 1.

The tubular member 1 shown in FIGS. 1 and 2 comprises an elongate transversely-curved conduit 2 defined by a transversely convexly-curved outer wall 3 and a transversely concavely-curved inner wall 4 joined along their long edges. The heat transfer fluid flows along the passage 5 and is heated by radiation falling on surface of wall 3. Radiation from wall 4 is reduced by thermal insulation in the form of asbestos rope 6 attached to the surface 4 and two further strands of asbestos rope 6' attached along the long edges of tubular member 1.

Figure 3:
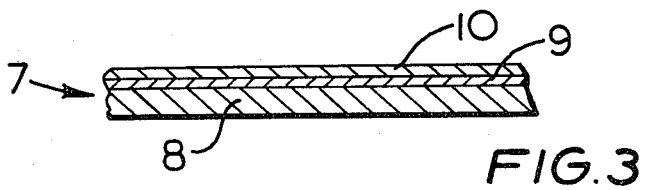
FIG. 3 shows a cross-section of a planar portion of a reflector for use in the invention.

Reflector 7 shown in FIG. 3 comprises a plastics material supporting sheet 8 to which has been applied by sputtering a thin layer of aluminium 9, which is in turn covered and protected by a covering layer 10.

Figure 4:
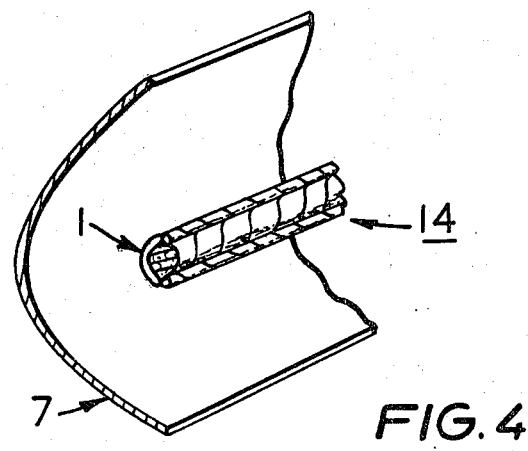
FIG. 4 shows a schematic perspective view of a portion of a parabolic mirror formed from a reflector of the invention with an absorber as shown in FIG. 1 positioned at the focus.

In the arrangement shown in FIG. 4 the tubular member 1 lies along the focal line of reflector 7 which has been formed into a parabolic mirror.

Figure 5:
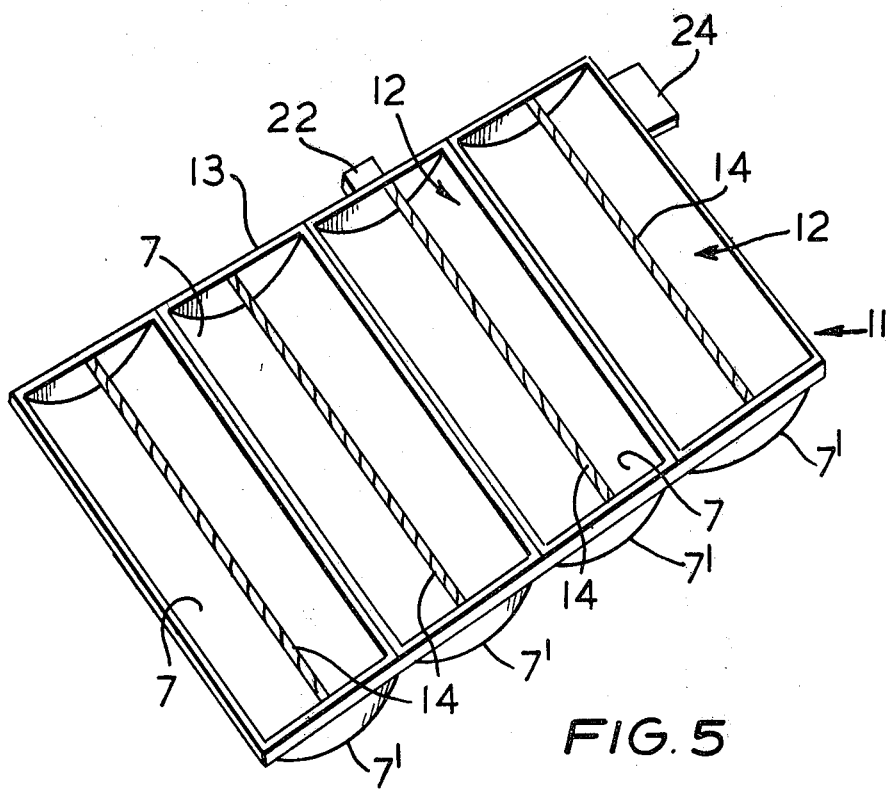
FIG. 5 shows a schematic perspective view of a solar energy converter of the invention.
Figure 6:
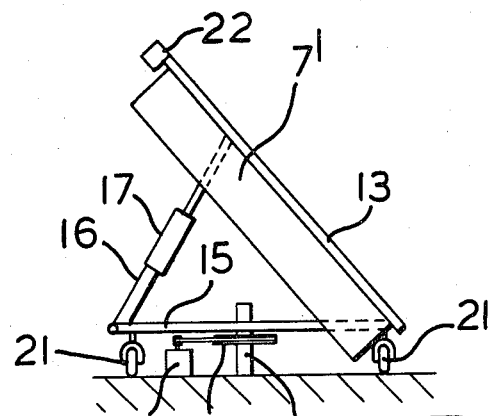
FIG. 6 is a schematic side view of the solar energy converter of FIG. 5.

FIG. 5 shows a solar energy converter 11 comprising four solar panels 12 formed by mounting reflectors 7 of the invention in suitably shaped shells 7' which are attached to a frame 13. At the focus of each reflector 7 there is mounted an absorber 14 of the invention comprising a tubular member as shown in FIGS. 1 and 2. As shown in FIG. 6 the frame 13 is located on a base 15 by supports 16. The frame 13 is pivotally mounted on the base and on supports 16 which are adjustable in length by means of the adjuster 17. The adjuster 17 may be either manually operable, or operated by a servo (not shown). In summer when the sun is higher, the panels 12 should be at a greater angle to the vertical and supports 16 are shortened. Conversely, in winter the supports 16 are lengthened and the panels 12 are moved to a more vertical elevation.

The base 15 is rotatable about a spindle 18 and is turned about the spindle by a motor 19 operating via a chain drive on a wheel 20 attached to the base 15. Support against lateral forces is given by wheels 21 which run on the ground on a suitably supported track.

Figure 7:
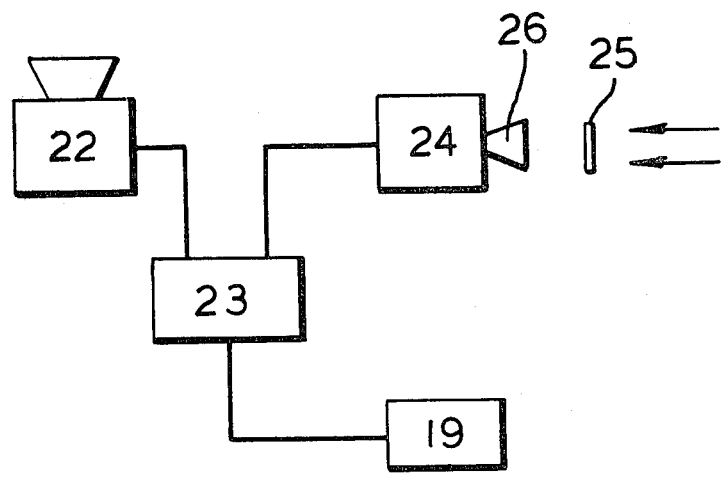
FIG. 7 is a block diagram of a control system for use in the invention.

The movement of the solar energy converter about the spindle 18 is controlled by the control system shown in FIG. 7. Photocell 22 detects general light conditions; when these reach a predetermined level at dawn the control system micro-processor 23 is activated. Thereafter unidirectional photocell 24, mounted alongside panels 12, controls the motor 19 via the micro-processor 23. When the sun casts a shadow of masking member 25 on the light-sensitive portion 26 of photocell 24 the motor 19 is immobilized. When sunlight reaches portion 26 motor 19 is activated and rotates base 15 until the portion 26 is again obscured by the shadow of masking member 25. In this way the panels 12 are kept in proper alignment with the sunlight for maximum efficiency.

A similar system may be used to control a servo to operate adjuster 17.

When the ambient light fails because of the onset of night, and not from momentary obscuring of the sun by clouds, photocell 22 triggers the micro-processor 23 to activate motor 19 so as to return the solar energy converter to a position where it will receive sunlight at dawn the next day. The control system is then de-activated until photocell 22 detects sunlight when dawn arrives.

The control system may also incorporate control of the heat transfer fluid system (not shown), and may for example include safety devices to move the panels 12 out of alignment with the sun in the event that the absorbers or the heat transfer fluid overheats.

Figure 8:
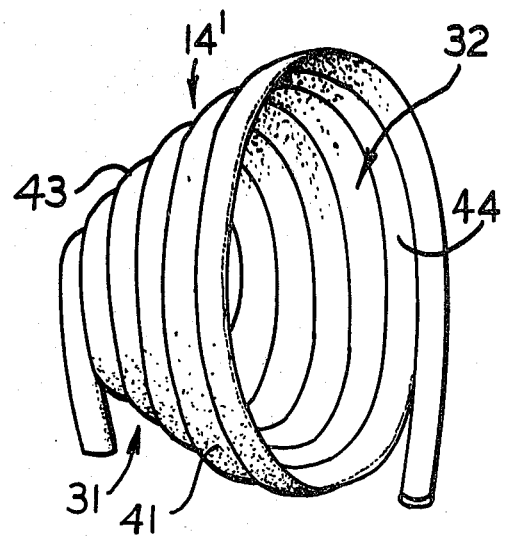
FIG. 8 is a perspective view of one embodiment of a dished absorber of the invention.

FIG. 8 shows a dished absorber 14' formed by coiling an elongate tube 41, having a flat cross-section, into an expanding helix. The coiled member is arranged so that the flat faces 43, 44 of the tube 41 lie on the convex face 31 and the concave face 32, respectively of the dish. Thermal insulation (not shown) may be applied to the concave face.

Figure 9:
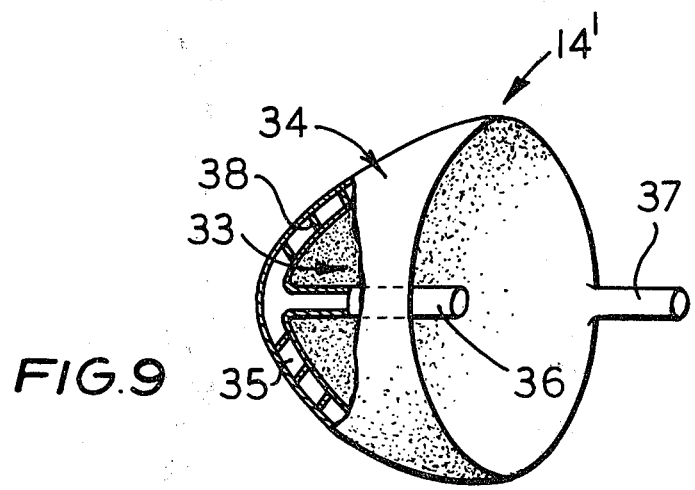
FIG. 9 is a perspective view of a second embodiment of a dished absorber of the invention shown partly in section.

The dished absorber 14' shown in FIG. 9 is fabricated from two parabolically-curved dishes 33, 34 joined at their edge to define a parabolically-curved internal chamber 35 between them. The heat exchange fluid is introduced into the chamber 35 by means of an inlet 36 and removed from the chamber 35 via outlet 37. The internal chamber 35 is provided with ducting 38 to ensure that the fluid circulates around substantially the whole of the chamber, conveniently along a helical path.

I claim:

1. A solar energy converter comprising a reflector and an absorber, said reflector being adapted for direct exposure to solar radiation and having a concavely curved reflecting surface for collecting and reflecting solar radiation onto said absorber, and said absorber comprising a convexly curved wall and a concavely curved wall joined together to define an internal chamber of generally crescent-shaped cross-section, said absorber being arranged with respect to the reflector so that solar radiation directed by the reflector onto the absorber falls substantially perpendicularly onto substantially the whole of the convexly curved wall thereof, said internal chamber being in the form of a narrow conduit for the passage of heat exchange fluid in a turbulent flow manner so as to remove heat from said convexly curved wall of the absorber, and including thermal insulation on said concavely curved wall of said absorber to minimize heat losses therefrom.

2. The solar energy converter according to claim 1 wherein the walls of the absorber are elongate and curved transversely to their long axes, being joined along their long edges to form a continuous elongate tubular member.

3. The solar energy converter according to claim 1 wherein the walls of the absorber are generally circular and dished being joined around their edges to define a generally circular chamber having a crescent-shaped cross-sections through its axis.

4. The solar energy converter according to claims 1, 2 or 3, wherein said thermal insulation on the concavely curved wall lies essentially wholly within the overall cross-sectional dimension of the absorber.

5. A method for converting solar radiation into heat energy comprising directly exposing a concavely curved reflecting surface to solar radiation, exposing an absorber to said reflecting surface for collecting solar radiation reflected by said reflecting surface, said absorber comprising a convexly curved wall and a concavely curved wall, said absorber being positioned relative to said reflecting surface so that the solar radiation reflected by the reflecting surface falls substantially perpendicularly onto the whole of the convexly curved wall of the absorber, said absorber walls being joined to define an internal chamber having a generally crescent-shaped cross-section defining a narrow conduit, passing a heat exchange fluid through said internal chamber of said absorber, the flow of said fluid being turbulent within said internal chamber, the heat exchange fluid being heated by the solar radiation directed onto the absorber as the fluid passes through the internal chamber, and minimizing heat losses from the absorber by use of thermal insulation on the concavely curved wall of the absorber.

6. The method of claim 5 wherein the walls of the absorber are elongate and curved transversely to their long axis, being joined along their long edges to form a continuous elongate tubular member.

7. The method of claim 5 wherein the walls of the absorber are generally circular and dished, being joined around their edges to define a generally circular chamber having crescent-shaped cross-section through its axis.

8. The method of converting solar radiation into heat energy of claim 5, 6 or 7, wherein the thermal insulation provided on the concavely curved wall lies essentially wholly within the overall cross-sectional dimension of the absorber so as to maximize the area of the reflecting surface exposed to solar radiation.

9. In a solar energy converter comprising a reflector and an absorber, said reflector having a concavely curved reflecting surface, said absorber including means for holding heat exchange fluid and having a solar energy absorbing wall including a convexly curved absorbing outer surface and an inner surface in contact with said heat exchange fluid; said reflector and said absorber being arranged so that solar radiation reflected from said reflector is concentrated onto said convexly curved absorbing surface; the improvement comprising said means comprising an internal chamber providing a space substantially cresent-shaped in cross-section through which said heat exchange fluid is capable of flowing; said chamber being defined by said absorbing wall and a non-absorbing wall; and said absorber being arranged with respect to said reflector to provide for said reflected solar radiation to fall substantially perpendicularly onto substantially the whole of said convexly curved absorbing surface of said absorber;

thereby to effect conversion of substantially all of said reflected solar radiation into thermal energy contained by said heat exchange fluid.

10. A solar converter according to claim 9 wherein the external surface of said non-absorbing wall is concavely curved and is in contact with and substantially covered by a layer of thermal insulation.

11. A solar converter according to claim 9 wherein said outer surface of said solar energy absorbing wall is in contact with the ambient atmosphere.

12. A solar energy converter according to claim 9 said means comprising a single internal chamber;

said internal chamber being defined by said absorbing wall and by a concavely curved non-absorbing wall, wherein said outer surface of said absorbing wall is in contact with the ambient atmosphere, and said outer surface of said non-absorbing wall is in contact with and substantially covered by a layer of thermal insulation.

* * * * *